G. JEBSEN & C. FINCKENHAGEN.
PROCESS OF SEPARATING SOLID SUBSTANCES FROM SOLUTIONS BY EVAPORATION.
APPLICATION FILED MAY 22, 1912.
1,074,264.
Patented Sept. 30, 1913.
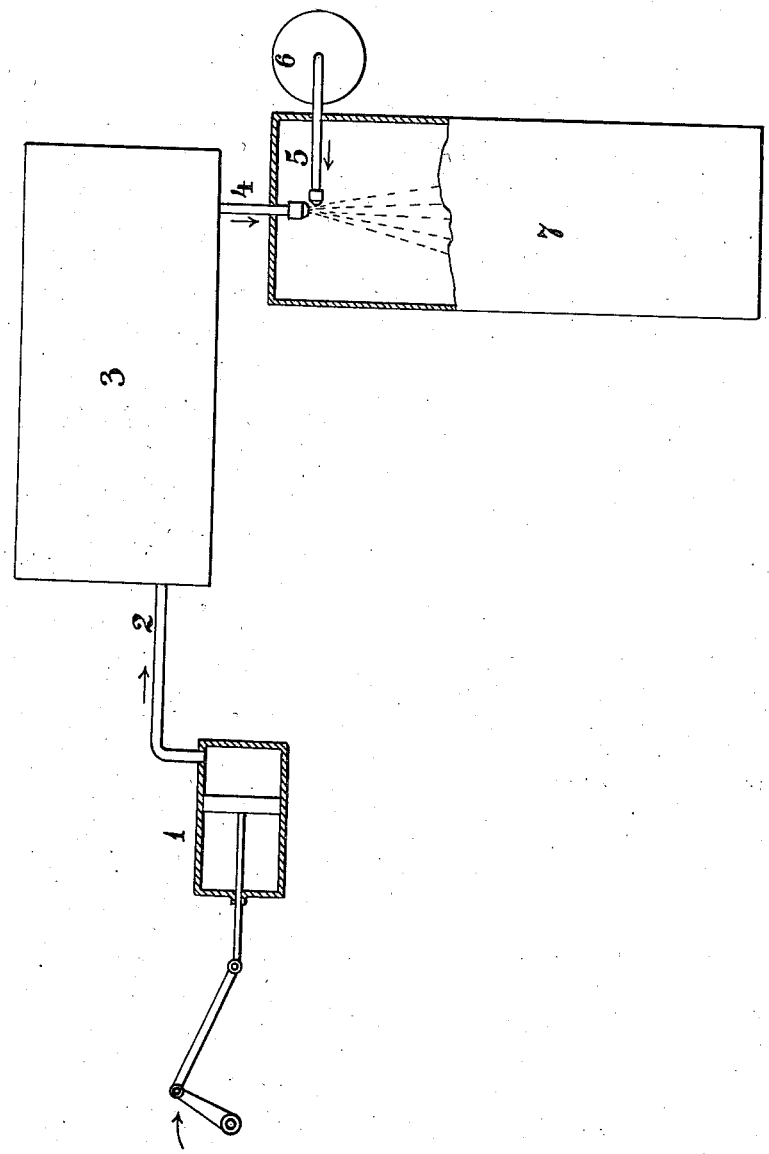
Witnesses:
Inventors:
Gustav Jebsen,
Christian Finckenhagen

UNITED STATES PATENT OFFICE.

GUSTAV JEBSEN AND CHRISTIAN FINCKENHAGEN, OF CHRISTIANIA, NORWAY.

PROCESS OF SEPARATING SOLID SUBSTANCES FROM SOLUTIONS BY EVAPORATION.

1,074,264. Specification of Letters Patent. Patented Sept. 30, 1913.

Application filed May 22, 1912. Serial No. 698,997.

*To all whom it may concern:*

Be it known that we, GUSTAV JEBSEN and CHRISTIAN FINCKENHAGEN, subjects of the King of Norway, both residing at Christiania, Norway, have invented certain new and useful Improvements in Processes of Separating Solid Substances from Solutions by Evaporation; and we do hereby declare the following to be a full, clear, and exact description of the invention, such as will enable others skilled in the art to which it appertains to make and use the same.

Our invention has for its object to provide a process of separating solid substances from solutions by evaporation. By solutions we mean in this instance liquids containing solid substances either in an actually dissolved state or otherwise distributed in the liquid, as for instance in emulsion, suspensions, etc.

The process is especially adapted for use in separating substances which cannot be heated for any length of time, such as the substances contained in milk, blood and the like, but it may also advantageously be employed in other solutions.

Experience shows that in most liquids the evaporation of solutions for separating dissolved substances ought to be carried out in as short a time as possible in order to reduce to a minimum or obviate chemical processes often occurring during the evaporation and which have an injurious effect on the substances to be separated off, such as rendering them partially indissoluble, imparting to them a bad taste, and the like.

It has been proposed to effect the evaporation or drying by means of transforming the liquid into a fine spray and subjecting the sprayed liquid to the action of a current of hot air. The spraying may be effected by means of a current of air. There are, however certain drawbacks connected with carrying out the process in this manner because the hot air affects the oxidation of the components of the liquid. To obviate this, instead of air, a gas without oxidizing properties, such as carbon dioxid, might be employed but such a process is too expensive. The injurious effect of the hot air is due to the fact that it acts for too long a time upon the components of the liquid. If the period of time in which the heated air acts upon the particles of the liquid could be reduced to a minimum the process might be carried out without injurious effects upon the product obtained. By this invention it is possible to effect the drying in the manner above stated by means of air without an oxidation or other injurious effects taking place and this is achieved by employing very high temperatures and by effecting the spraying in such manner that the drying takes place instantaneously. Such instantaneous drying is obtained by means of the spraying being effected by conducting a jet of highly heated compressed air (or other gas) so as to converge upon a jet of the liquid treated. For this purpose the injector-principle may suitably be made use of in the form in which it may be best known in ordinary life, viz. as small syringes for spraying plants and flowers.

In the accompanying drawing, a plant is illustrated diagrammatically for carrying out the above described process.

In said drawing 1 designates an air compressor, 2 a pipe for conducting the compressed air to a heating apparatus 3, and 4 a nozzle by which the compressed heated air is injected into a drying chamber 7.

The liquid to be evaporated is contained in a receptacle 6 which is connected with the drying chamber by a pipe 5 extending into the latter preferably at an angle of 90° to the nozzle 4. Thus a current of compressed heated air passing from the nozzle 4 will suck the liquid from the pipe 5 and spray it into the drying chamber, the air expanding at the same time. We have found that a spraying apparatus in which the pipes for the liquid and for the air respectively are directly connected to one another could not be employed in connection with the present process on account of the high temperature employed. The air will be quickly cooled down partly on account of the expansion, partly because as a consequence of the intimate mixing and the exceedingly fine distribution, the milk takes up a great amount of heat. Thereby it is rendered possible to use drying-air of very high temperature, which will effect the drying in the shortest time possible.

The temperature, the pressure, the nozzle mouths of the two pipes as well as their position in relation to one another may be varied to suit the requirements. The applicants have for instance used air heated to a temperature of from 250° to 600° C. at a pressure of 1.5 to 3 atmospheres. The effect is so intense as to cause the milk to immediately assume a nebulous form; at a distance of about 1 meter from the mouth of the liquid-containing pipe a temperature of 50° to 60° C. was observed.

It is obvious that besides compressed air also air of ordinary pressure may be supplied to the drying chamber.

The sprayed liquid is conducted into suitable collecting chambers in which the milk is deposited in a state of exceedingly fine distribution.

Claims:

1. The process of evaporating to dryness, milk and other solutions containing easily decomposable substances which consists in simultaneously atomizing and evaporating the solution by directing a jet of compressed air having a temperature of from 250° to 600° C., so as to converge upon a jet of the solution.

2. The process of evaporating to dryness, milk and other solutions containing easily decomposable substances which consists in simultaneously atomizing and evaporating the solution by directing a jet of compressed air having a temperature of from 250° to 600° C., and a pressure of from 1.5 to 3 atmospheres so as to converge upon a jet of the solution.

3. The process of evaporating milk and similar solutions to dryness, which consist in simultaneously atomizing and evaporating the solution by directing a jet of compressed air having a temperature of from 250° to 600° C., at an angle of about 90° against the exit of a pipe through which the milk is sucked into the path of the jet of air by the action of said jet of air.

In testimony that we claim the foregoing as our invention, we have signed our names in presence of two subscribing witnesses.

GUSTAV JEBSEN.
CHRISTIAN FINCKENHAGEN.

Witnesses:
AUG. OLSEN,
C. MÜLLER.